United States Patent
Okano et al.

(10) Patent No.: US 10,187,271 B2
(45) Date of Patent: Jan. 22, 2019

(54) NETWORK-DIAGRAM RENDERING SYSTEM, NETWORK-DIAGRAM RENDERING METHOD, AND NETWORK-DIAGRAM RENDERING COMPUTER READABLE MEDIUM

(71) Applicant: NEC Corporation, Minato-ku, Tokyo (JP)

(72) Inventors: Yu Okano, Tokyo (JP); Yohei Iizawa, Tokyo (JP); Masaharu Morimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 303 days.

(21) Appl. No.: 15/035,531

(22) PCT Filed: Sep. 18, 2014

(86) PCT No.: PCT/JP2014/004817
§ 371 (c)(1),
(2) Date: May 10, 2016

(87) PCT Pub. No.: WO2015/072059
PCT Pub. Date: May 21, 2015

(65) Prior Publication Data
US 2016/0294637 A1    Oct. 6, 2016

(30) Foreign Application Priority Data
Nov. 13, 2013 (JP) ................................. 2013-234564

(51) Int. Cl.
*G06F 15/177* (2006.01)
*H04L 12/24* (2006.01)

(52) U.S. Cl.
CPC ............. *H04L 41/22* (2013.01); *H04L 41/12* (2013.01)

(58) Field of Classification Search
USPC ............. 370/221; 379/399.01; 707/610, 613; 709/203, 206, 217, 219, 220, 221, 222,
(Continued)

(56) References Cited

U.S. PATENT DOCUMENTS

| | | | |
|---|---|---|---|
| 6,427,134 B1* | 7/2002 | Garner | .................... G10L 25/78 379/399.01 |
| 2012/0166390 A1* | 6/2012 | Merriman | ......... G06F 17/30578 707/613 |

(Continued)

FOREIGN PATENT DOCUMENTS

| | | |
|---|---|---|
| JP | H09-292961 A | 11/1997 |
| JP | 2006-091971 A | 4/2006 |

(Continued)

OTHER PUBLICATIONS

Kazuo Misue, "Visualization Techiniques to Networks: Challenge to Large-Scale Networks and Dynamic Networks", IEICE Technical Report, vol. 92, No. 2, 2009 English Abstract Cited in the Specification.

(Continued)

*Primary Examiner* — Quang N Nguyen

(57) ABSTRACT

A network-diagram rendering system for rendering a network diagram including nodes and links as elements of a network configuration is provided with: an index calculation unit (81) which calculates, for each node, an index indicating a degree that the node is a primary node in the network configuration, using network configuration information as information to be obtained from the network configuration; and a primary node coefficient setting unit (82) which sets a primary node coefficient for the node to be higher as the index increases, the primary node coefficient being a value indicating a degree of not changing a rendering position of a network diagram associated with a change in the network configuration.

7 Claims, 10 Drawing Sheets

(58) Field of Classification Search
USPC .............................. 709/223, 224, 226, 228
See application file for complete search history.

(56) References Cited

U.S. PATENT DOCUMENTS

| 2013/0290249 | A1* | 10/2013 | Merriman ......... G06F 17/30578 707/610 |
| 2014/0376361 | A1* | 12/2014 | Hui ...................... H04L 45/22 370/221 |

FOREIGN PATENT DOCUMENTS

| JP | 2008-129990 A | 6/2008 |
| JP | 2008-262485 A | 10/2008 |
| JP | 2009-146382 A | 7/2009 |
| JP | 2014-142900 A | 8/2014 |

OTHER PUBLICATIONS

Takayoshi Iida, Kiyoyuki Kodama, Toshimitsu Arita, Shunsuke Fujita, and Kazuyuki Yoshida, "Improvement of Layout Algorithm for Network Topology Visualizing System and Its Evaluation", Collected papers of Multimedia, Distributed, Cooperative and Mobile (DICOMO2008) Symposium, IPSJ Symposium Series vol. 2008 No. 1 [CD-ROM], Jul. 2, 2008, pp. 1198-1205, English Abstract Cited in ISR.
Hiroko Nakamura Miyamura, Masahiro Yoshida, Satoshi Ohzahata, Shigeo Takahashi, Akihiro Nakao, and Konosuke Kawashima, "A Multilevel Graph Layout for Analyzing Large-scale Network Datasets", IEICE Technical Report, vol. 111 No. 468, Mar. 1, 2012, pp. 243-248, English Abstract Cited in ISR.
International Search Report for PCT Application No. PCT/JP2014/004817 , dated Nov. 11, 2014.
English translation of Written opinion for PCT Application No. PCT/JP2014/004817.

* cited by examiner

Fig. 3

| NODE | LINK | CAPACITY AMOUNT | PRIMARY NODE COEFFICIENT | COORDINATES |
|---|---|---|---|---|
| Node 1 | Link: {1} | 10 | 0 | x,y |
| Node 2 | Link: {3} | 2 | 0 | x,y |
| Node 3 | Link: {4, 5} | 35 | 1 | x,y |
| Node 4 | Link: {1, 2} | 18 | 0 | x,y |
| Node 5 | Link: {2, 3, 4, 8} | 26 | 0 | x,y |
| Node 6 | Link: {6, 8, 9, 10} | 34 | 1 | x,y |
| Node 7 | Link: {5} | 30 | 1 | x,y |
| Node 8 | Link: {9, 11, 12} | 27 | 0 | x,y |
| Node 9 | Link: {7, 10, 11} | 19 | 0 | x,y |
| Node 10 | Link: {6, 7, 12} | 9 | 0 | x,y |

(columns labeled F101, F102, F103, F104, F105)

| LINK (F111) | Capacity (F112) |
|---|---|
| Link1 | 10 |
| Link2 | 8 |
| Link3 | 2 |
| Link4 | 5 |
| Link5 | 30 |
| Link6 | 2 |
| Link7 | 4 |
| Link8 | 11 |
| Link9 | 15 |
| Link10 | 6 |
| Link11 | 9 |
| Link12 | 3 |

| PRIMARY NODE RATIO (F121) |
|---|
| 30% |

| INTER-NODE CORRELATION | Node 1 | Node 2 | Node 3 | Node 4 | Node 5 | Node 6 | Node 7 | Node 8 | Node 9 | Node 10 |
|---|---|---|---|---|---|---|---|---|---|---|
| Node 1 | | | | | | | | | | |
| Node 2 | | | | | | | | | | |
| Node 3 | | | | | | | | | | |
| Node 4 | | | | | | | | | | |
| Node 5 | | | | | | | | | | |
| Node 6 | | | | | | | | | | |
| Node 7 | | | | | | | | | | |
| Node 8 | | | | | | | | | | |
| Node 9 | | | | | | | | | | |
| Node 10 | | | | | | | | | | |

NETWORK-DIAGRAM RENDERING SYSTEM, NETWORK-DIAGRAM RENDERING METHOD, AND NETWORK-DIAGRAM RENDERING COMPUTER READABLE MEDIUM

This application is a National Stage Entry of PCT/JP2014/004817 filed on Sep. 18, 2014, which claims priority from Japanese Patent Application 2013-234564 filed on Nov. 13, 2013, the contents of all of which are incorporated herein by reference, in their entirety.

TECHNICAL FIELD

The present invention relates to a network-diagram rendering system, a network-diagram rendering method, and a network-diagram rendering program for rendering a network diagram.

BACKGROUND ART

A network diagram (also called as a network topology) is sometimes used for allowing a user to grasp a configuration of a system that individual information processing devices are connected to each other by a network. Specifically, in the network diagram, the overall image of a network is expressed by rendering devices as nodes and networks as links. The network diagram is generally regarded as an excellent diagram, because the network diagram can visualize individual connections between nodes.

A coordinate is given to each node in rendering such a diagram. In this case, an approach for automatically calculating coordinates is proposed in order to save labor in giving a fixed coordinate to each node.

For instance, NPL 1 describes a method called a dynamic model, as a method for calculating coordinates of nodes. In the method described in NPL 1, a repulsive force is set between nodes, and a spring component is set for a link, to calculate coordinates of the nodes.

Further, PTL 1 describes a graph visualization method, in which nodes are disposed in such a manner that areas where nodes densely exist, or nodes whose sizes are different from each other, do not overlap each other. In the graph visualization method described in PTL 1, coordinates are calculated by adjusting dynamic energy of individual nodes.

Further, PTL 2 describes a data display processing system for displaying structure information. In the system described in PTL 2, each element is displayed in a different display manner based on a degree of displaying importance of each element composing structure information.

CITATION LIST

Patent Literature

PTL 1: Japanese Laid-open Patent Publication No. 2009-146382
PTL 2: Japanese Laid-open Patent Publication No. H9-292961

Non Patent Literature

NPL 1: "Technique for Visualizing Network: Challenge to Large-Scale Network and Dynamic Network" by Kazuo Misue, IEICE Technical Report, Vol. 92, No. 2, 2009

SUMMARY OF INVENTION

Technical Problem

As described above, various approaches for allowing a user to visually recognize and easily grasp a network configuration have been proposed. However, as described in NPL 1, the network configuration dynamically changes. In this case, it is necessary to manually set positions of nodes again.

Further, when a method for automatically calculating coordinates, such as a dynamic model, is employed, positions of the existing nodes after re-calculation may greatly deviate. The user is required to search a target node to be monitored, each time the network configuration changes. This leads to a problem that it may be difficult for the user to continuously grasp the node. The same problem may be involved when the technique described in PTL 1 or PTL 2 is employed.

In view of the above, an exemplary object of the present invention is to provide a network-diagram rendering system, a network-diagram rendering method, and a network-diagram rendering program for rendering a network diagram, that make it easy for a user to continuously find a target node, even when nodes or links composing a network dynamically change.

Solution to Problem

According to the present invention, a network-diagram rendering system for rendering a network diagram including nodes and links as elements of a network configuration is provided. The network-diagram rendering system includes:
an index calculation unit which calculates, for each node, an index indicating a degree that the node is a primary node in the network configuration, using network configuration information as information to be obtained from the network configuration; and
a primary node coefficient setting unit which sets a primary node coefficient for the node to be higher as the index increases, the primary node coefficient being a value indicating a degree of not changing a rendering position of a network diagram associated with a change in the network configuration.

According to the present invention, a network-diagram rendering method for rendering a network diagram including nodes and links as elements of a network configuration is provided. The network-diagram rendering method includes:
calculating, for each node, an index indicating a degree that the node is a primary node in the network configuration, using network configuration information as information to be obtained from the network configuration; and
setting a primary node coefficient for the node to be higher as the index increases, the primary node coefficient being a value indicating a degree of not changing a rendering position of a network diagram associated with a change in the network configuration.

According to the present invention, a network-diagram rendering program to be applied to a computer configured to render a network diagram including nodes and links as elements of a network configuration is provided. The network-diagram rendering program causes the computer to execute:
an index calculation process of calculating, for each node, an index indicating a degree that the node is a primary node in the network configuration, using network configuration information as information to be obtained from the network configuration; and a primary node coefficient setting process of setting a primary node coefficient for the node to be higher as the index increases, the primary node coefficient being a value indicating a degree of not changing a rendering position of a network diagram associated with a change in the network configuration.

Advantageous Effects of Invention

According to the present invention, it is possible to render a network diagram with which a user can continuously and easily find a target node even when nodes or links composing a network dynamically change.

BRIEF DESCRIPTION OF DRAWINGS

FIG. 3 is an explanatory diagram illustrating an example of network configuration information;

DESCRIPTION OF THE EXEMPLARY EMBODIMENTS

Figure 1:
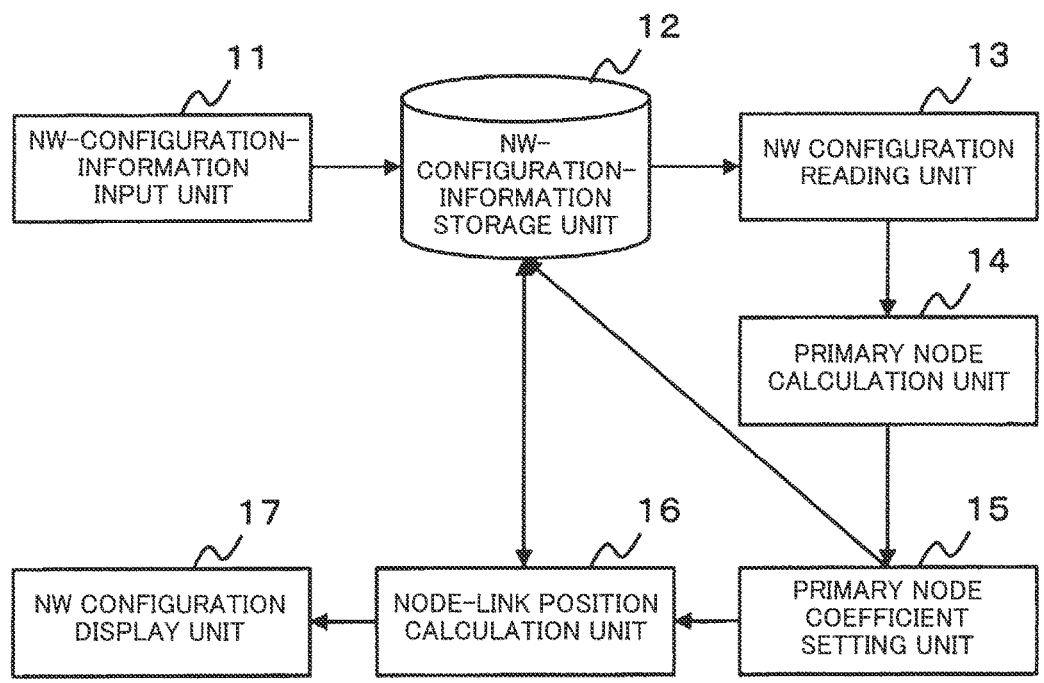
FIG. 1 is a block diagram illustrating a configuration example of a first exemplary embodiment of a network-diagram rendering system according to the present invention.

In the following, exemplary embodiments of the present invention are described referring to the drawings.

First Embodiment

FIG. 1 is a block diagram illustrating a configuration example of the first exemplary embodiment of a network-diagram rendering system according to the present invention. In the following description, a network may be abbreviated as an NW (Network).

The network diagram-rendering system in the exemplary embodiment is provided with an NW-configuration-information input unit 11, an NW-configuration-information storage unit 12, an NW configuration reading unit 13, a primary node calculation unit 14, a primary node coefficient setting unit 15, a node-link position calculation unit 16, and an NW configuration display unit 17.

The NW-configuration-information input unit 11 inputs, as NW-configuration-information, a network diagram including nodes, each of which represents a function of an information processing device, and links representing a network for connecting nodes; and records the input NW configuration information in the NW-configuration-information storage unit 12. Specifically, the NW-configuration-information is information including nodes and links, and is information indicating which node is connected to which link, and which link connects between which nodes. In other words, it can be said that the NW-configuration-information is information to be obtained from each element included in a network configuration.

Input of a network diagram may be manually performed by the user or may be automatically performed by the system. Further, the NW-configuration-information input unit 11 may input NW-configuration-information to be received via a communication network.

The NW-configuration-information storage unit 12 stores NW configuration information input by the NW-configuration-information input unit 11. The NW configuration reading unit 13 or the node-link position calculation unit 16 to be described later reads NW-configuration-information from the NW-configuration-information storage unit 12. In other words, it can be said that the NW-configuration-information storage unit 12 provides NW-configuration-information to the NW configuration reading unit 13 or to the node-link position calculation unit 16.

The NW configuration reading unit 13 reads NW-configuration-information from the NW-configuration-information storage unit 12, and processes the read NW-configuration-information as data for use in rendering a network diagram on a screen. Specifically, the NW configuration reading unit 13 reads all the information about nodes and links included in NW-configuration-information as information to be rendered on a screen, and sets the initial coordinates on the screen for the nodes. Then, the NW configuration reading unit 13 sends NW-configuration-information including the set initial coordinates to the primary node calculation unit 14.

The NW configuration reading unit 13 may select the initial coordinates at random from the coordinates on a screen, or may determine the initial coordinates by using a well-known other method.

The primary node calculation unit 14 receives NW-configuration-information from the NW configuration reading unit 13, and calculates an index for specifying a primary node in a network configuration (hereinafter, referred to as a primary node). In other words, it can be said that the index is a value indicative of a degree that the node is a primary node in a network configuration.

The primary node is a node to be specified according to criteria for which the user determines the node to be a primary node. Examples of the criteria for which the user determines whether the node is a primary node are that communication is frequently performed in a network, the communication speed is fast, relatively long time has passed after the node is generated, and the like. However, the criteria for which the user determines whether the node is a primary node are not limited to the criteria of aforementioned examples. As described above, the primary node calculation unit 14 calculates an index for each node by using NW-configuration-information. The primary node calculation unit 14 sends NW-configuration-information including the calculated indexes to the primary node coefficient setting unit 15.

In the exemplary embodiment, a method using a Capacity amount is described as an example of the index. The Capacity amount is a value to be calculated for each node by the primary node calculation unit 14, and is a value indicating an importance of each node in a network configuration.

In the exemplary embodiment, the primary node calculation unit 14 acquires a Capacity set for each link from NW-configuration-information. Then, the primary node calculation unit 14 totalizes the Capacities of the links connected to a node to calculate the Capacity amount. The primary node calculation unit 14 may use, as a Capacity of each link, various values such as the communication speed of the network, a time elapsed from the time when the link is generated, a frequency of use of the network, and the number of packets used for communication. Thus, the primary node calculation unit 14 may use a value which the user determines to be important in the network, as a Capacity.

When the primary node coefficient used by the primary node coefficient setting unit 15, to be described later, is set as a continuous volume, it is possible to use an equation in which a friction term is added to a formula expressing a dynamic model as a Capacity to suppress deviation of the position of a primary node, which occurs as the primary node coefficient increases.

The primary node calculation unit 14 inputs NW configuration information including the calculated indexes to the primary node coefficient setting unit 15.

The primary node coefficient setting unit 15 acquires NW-configuration-information including the Capacity meters from the primary node calculation unit 14, and calculates a primary node coefficient. The primary node coefficient is set for each node, and is a value indicating a degree of not changing the rendering position of a network diagram associated with a change in the network configuration. The primary node coefficient setting unit 15 sets higher primary node coefficient as the aforementioned index increases.

In the exemplary embodiment, the primary node coefficient is set to 1 or 0. The node whose primary node coefficient is set to 1 represents a node whose coordinates remain unchanged (fixed) even when the time elapses or even when the network configuration changes, unless the node itself is deleted. On the other hand, the node whose primary node coefficient is set to 0 represents a node whose coordinates change as the environment changes. The primary node coefficient setting unit 15 sets the primary node coefficient of a node whose Capacity amount is large to 1, and sets the primary node coefficient of a node other than the above to 0.

However, the value of the primary node coefficient is not limited to a binary value of 1 and 0. The primary node coefficient setting unit 15 may calculate a primary node coefficient such that the coordinates of a node are dynamically less changeable in proportion to the size of an index.

Further, in the exemplary embodiment, a node whose primary node coefficient is set to 1 is described as a primary node. It is desirable for the primary node coefficient setting unit 15 to set a number of nodes to be selected as primary nodes, to a part of all the nodes. In view of the above, the primary node coefficient setting unit 15 may rank the values of Capacity amounts so that the primary node coefficient is set to 1 only for a part of the highly ranked nodes among all the nodes, and the primary node coefficient is set to 0 for the rest of the nodes.

For instance, the primary node coefficient setting unit 15 may determine a part of the highly ranked nodes as primary nodes based on a ratio set by the user, or may determine a part of the highly ranked nodes as primary nodes based on a ratio calculated by another system (not illustrated).

The node-link position calculation unit 16 calculates the coordinates of each node included in NW-configuration-information. The node-link position calculation unit 16 may calculate the coordinates of each node by using a well-known method such as a general dynamic model. For example, the node-link position calculation unit 16 may calculate a repulsive force between all the nodes, and may calculate the coordinates of the nodes by using links in which spring is set.

The primary node whose primary node coefficient is set to 1 is a node whose coordinates remain unchanged (fixed). Therefore, the node-link position calculation unit 16 skips calculation of coordinates of the primary node, and do not update the coordinates. According to this configuration, it is possible to suppress a change in the positions of coordinates. This is advantageous in making it easy for the user to continuously find a target primary node.

The node-link position calculation unit 16 sends NW-configuration-information including the updated coordinates to the NW configuration display unit 17.

The NW configuration display unit 17 acquires NW-configuration-information including the coordinates of individual nodes from the node-link position calculation unit 16, and renders a network diagram. Specifically, the NW configuration display unit 17 re-renders a diagram each time the coordinates are updated. In this case, the node-link position calculation unit 16 is capable of suppressing a change in the coordinates of a primary node. Therefore, it is possible to suppress a change in the position of the primary node in re-rendering the primary node.

An example of a device for rendering a diagram is a general display device. For instance, the NW configuration display unit 17 may emphatically display a node that is a primary node, may display a node by attaching characters indicating that the node is a primary node, or may display the node by attaching a mark so that the user can easily and visually recognize the node.

The NW configuration reading unit 13, the primary node calculation unit 14, the primary node coefficient setting unit 15, the node-link position calculation unit 16, and the NW configuration display unit 17 are implemented by a CPU of a computer which is operated according to a program (a network-diagram rendering program). For instance, the program may be stored in a storage unit (not illustrated) of a terminal which renders a network diagram. A CPU may then read the program so that the CPU is operated, according to the program, as the NW configuration reading unit 13, the primary node calculation unit 14, the primary node coefficient setting unit 15, the node-link position calculation unit 16, and the NW configuration display unit 17.

Further, the NW configuration reading unit 13, the primary node calculation unit 14, the primary node coefficient setting unit 15, the node-link position calculation unit 16, and the NW configuration display unit 17 may be individually implemented by dedicated hardware components.

Further, the NW configuration information storage unit 12 is implemented by, for example, a magnetic disk device.

Figure 2:
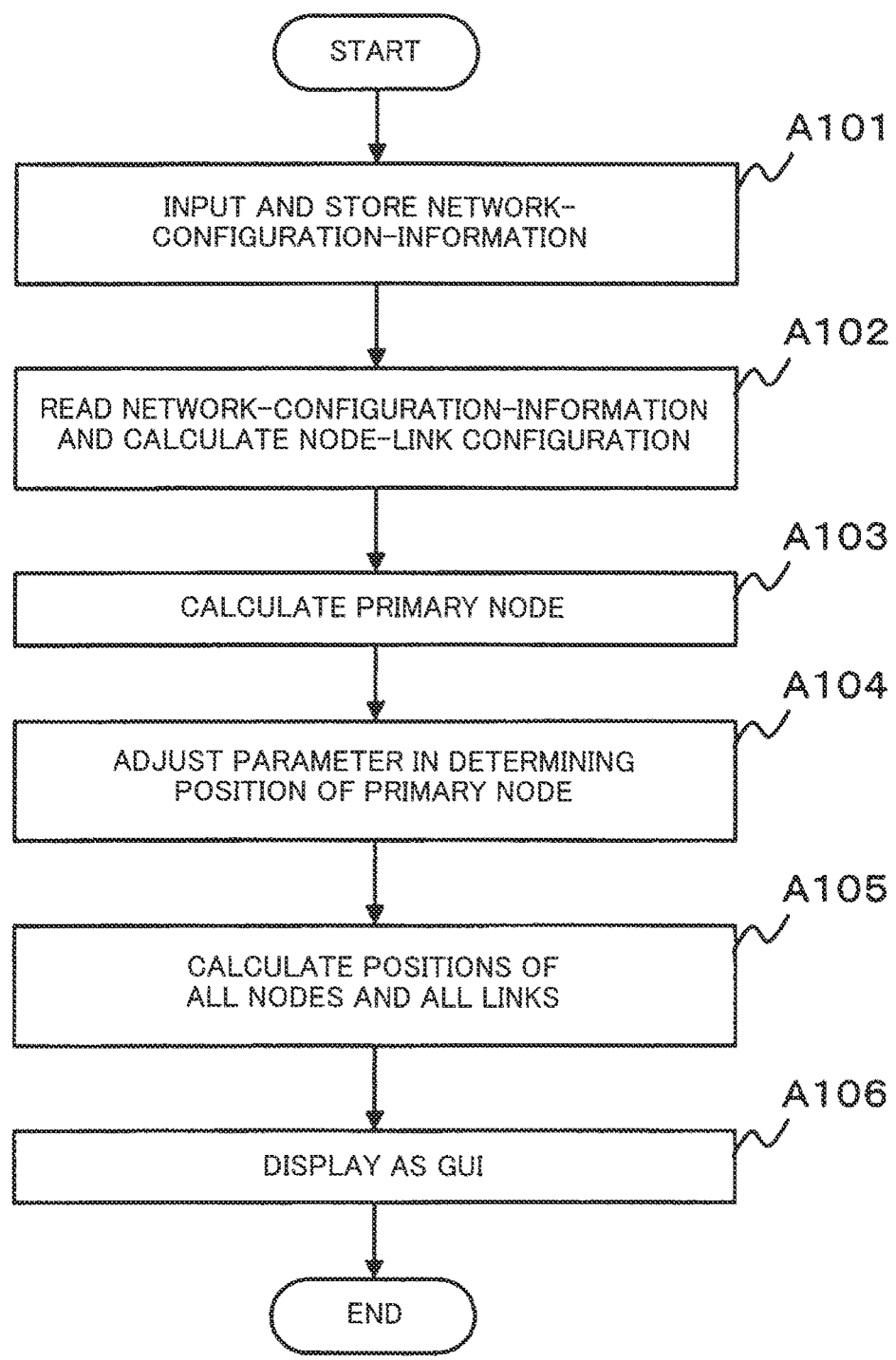
FIG. 2 is a flowchart illustrating an operation example of the network-diagram rendering system in the first exemplary embodiment.

Next, an operation of the network-diagram rendering system in the exemplary embodiment is described. FIG. 2 is a flowchart illustrating an operation example of the network-diagram rendering system in the exemplary embodiment.

The NW-configuration-information input unit 11 is operated in response to an input from the user or from an external system. Specifically, the NW-configuration-information input unit 11 inputs NW configuration information including elements indicating nodes representing information processing devices, and links representing a network, and stores the input NW-configuration-information in the NW-configuration-information storage unit 12 (Step A101).

FIG. 3 is an explanatory diagram illustrating an example of NW-configuration-information. In the NW-configuration-information illustrated in FIG. 3, each node F101 is associated with a connected link F102. Further, in the example illustrated in FIG. 3, the node F101 is associated with a Capacity amount F103, a primary node coefficient F104, and coordinates F105. A predetermined initial value may be set for the coordinates F105 of each node. Alternatively, a random value, or a value obtained by a certain calculation method may be set for the coordinates F105 of each node.

After an operation of Step A101, the NW configuration reading unit 13 is operated in response to an instruction from the NW-configuration-information input unit 11. Specifically, the NW configuration reading unit 13 reads, from the NW-configuration-information storage unit 12, the node F101, the link F102, and the coordinates F105 illustrated in FIG. 3, as NW-configuration-information.

Subsequently, the NW configuration reading unit 13 calculates a node-link configuration (Step A102). Specifically, the NW configuration reading unit 13 calculates a Capacity of a link connected to each node, as a node-link configuration. The NW configuration reading unit 13 may use a well-known method as a method for calculating a Capacity of each link. Further, the NW-configuration-information storage unit 12 may store calculated Capacities of links in advance. In this case, the NW configuration reading unit 13 may read a Capacity of a link from the NW-configuration-information storage unit 12, and may use the value of the Capacity.

Figures 4, 5:
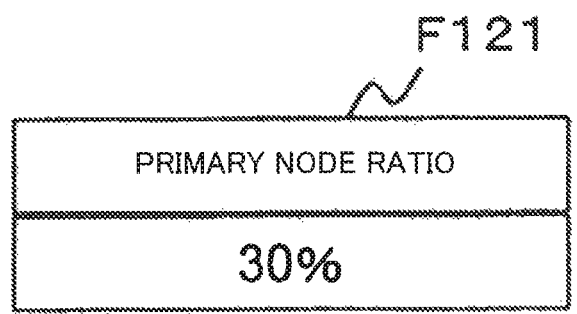
FIG. 4 is an explanatory diagram illustrating an example of Capacities of links.
FIG. 5 is an explanatory diagram illustrating an example of information in which a primary node ratio is determined.

FIG. 4 is an explanatory diagram illustrating an example of Capacities of links. In the description about the operation of the system, Capacities of links are assumed to be already stored in the NW-configuration-information storage unit 12. In the example illustrated in FIG. 4, a Capacity F112 is associated with each link F111.

The primary node calculation unit 14 is operated in response to NW configuration information from the NW configuration reading unit 13. The primary node calculation unit 14 calculates an index for specifying a primary node, and sets the calculated index for a Capacity amount of NW-configuration-information. The primary node calculation unit 14 provides the primary node coefficient setting unit 15 with NW-configuration-information including Capacity amounts to issue an instruction to operate the system (Step A103).

The primary node coefficient setting unit 15 is operated in response to an instruction from the primary node calculation unit 14. The primary node coefficient setting unit 15 ranks the nodes based on the acquired Capacity amounts, sets the primary node coefficient 1 for a part of the highly-ranked nodes as primary nodes, and sets the primary node coefficient 0 for the rest of the nodes. In this way, the primary node coefficient setting unit 15 adjusts the primary node coefficient which is a parameter for determining the position of a primary node (Step A104).

The primary node coefficient setting unit 15 may determine nodes of a predetermined ratio as primary nodes. FIG. 5 is an explanatory diagram illustrating an example of information in which the ratio of primary nodes is determined. In the example illustrated in FIG. 5, 30% is designated as a primary node ratio F121. In this case, the primary node coefficient setting unit 15 may determine the nodes whose Capacity amounts are ranked top 30% as primary nodes from among all the nodes.

When there is a change in the network configuration, in other words, when a node or a link is added or deleted, the node-link position calculation unit 16 calculates the positions of the nodes and the positions of the links in response to an instruction from the primary node coefficient setting unit 15. Further, the node-link position calculation unit 16 may automatically repeat calculation on the positions of the nodes and the positions of the links periodically for re-rendering process (Step A105).

In the exemplary embodiment, the node-link position calculation unit 16 may calculate the positions of nodes and the positions of links based on a general dynamic model. When the calculation is performed, however, the node-link position calculation unit 16 calculates the coordinates in such a manner that the positions of the nodes whose primary node coefficient is set to 1 remain unchanged. The node-link position calculation unit 16 sets the calculated positions of nodes and links (specifically, the coordinates of nodes) in NW-configuration-information.

The NW configuration display unit 17 is operated in response to an instruction from the node-link position calculation unit 16. The NW configuration display unit 17 renders a network diagram based on the NW-configuration-information calculated up to Step A105 (Step A106). For instance, the NW configuration display unit 17 may render a network diagram on a general display device as a GUI (Graphical User Interface).

Next, an operation of the network-diagram rendering system in the exemplary embodiment is described using the flowchart illustrated in FIG. 2, and the specific examples illustrated in FIG. 3 to FIG. 5.

As a first step, the NW-configuration-information input unit 11 inputs NW-configuration-information, and stores the input NW-configuration-information in the NW-configuration-information storage unit 12 (Step A101). In the specific example, the NW-configuration-information illustrated in FIG. 3 is input, and the coordinates F105 of each node is given at random within a rendering area.

Subsequently, the NW configuration reading unit 13 reads the NW-configuration-information from the NW-configuration-information storage unit 12, and calculates a node-link configuration (Step A102). In the specific example, the NW configuration reading unit 13 reads NW-configuration-information including the nodes F101, the links F102, and the coordinates F105 illustrated in FIG. 3, and reads NW-configuration-information including the links F111 and the Capacities F112 illustrated in FIG. 4 so that the NW-configuration-information is usable in the steps thereafter.

Subsequently, the primary node calculation unit 14 calculates an index for specifying a primary node, and sets the calculated index in the Capacity amount of NW-configuration-information (Step A103). In the specific example, the primary node calculation unit 14 totalizes the Capacities of the links connected to each node, which are illustrated in FIG. 4, and sets the total value as the Capacity amount of each node. The Capacity amounts F103 illustrated in FIG. 3 are calculation results of the Capacity amounts in the specific example.

The primary node coefficient setting unit 15 ranks the nodes based on the calculated Capacity amounts. Subsequently, the primary node coefficient setting unit 15 determines the highly-ranked nodes corresponding to the ratio illustrated in FIG. 5, as primary nodes (Step A104).

In the specific example, three nodes are determined to be primary nodes. Referring to the Capacity amounts F103 illustrated in FIG. 3, the three nodes whose Capacity amounts are ranked top three are the node 3, the node 6, and the node 7. Therefore, the primary node coefficient setting unit 15 sets the primary node coefficient for the three nodes to 1, and sets the primary node coefficient for the rest of the nodes to 0.

Subsequently, the node-link position calculation unit 16 calculates the positions of the nodes and the positions of the links (Step A105). In the specific example, the node-link position calculation unit 16 may calculate the coordinates by using a general dynamic model, for instance. When the calculation is performed, however, the node-link position calculation unit 16 calculates the coordinates in such a manner as to suppress a change in the position of the node that is determined to be a primary node.

Figure 6:
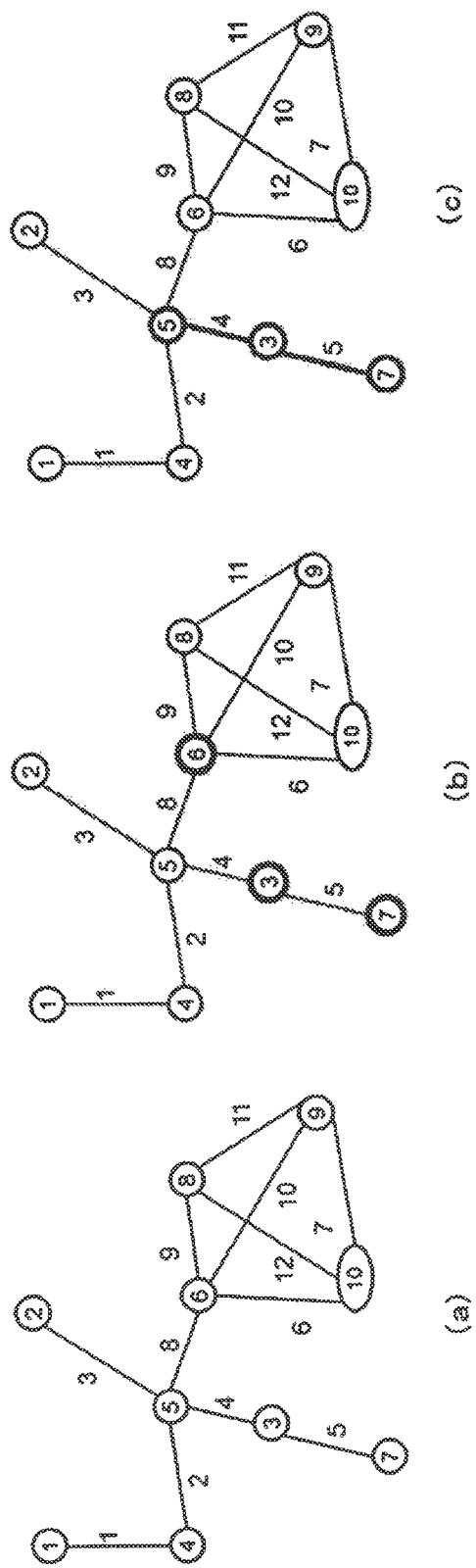
FIG. 6 is an explanatory diagram illustrating an example of a network diagram to be rendered.

The NW configuration display unit 17 renders a network diagram based on the NW-configuration-information calculated up to Step A105 (Step A106). FIG. 6 is an explanatory diagram illustrating an example of a network diagram to be rendered. As illustrated in FIG. 6, the NW configuration display unit 17 renders a network diagram as to illustrate relations between nodes and links (see FIG. 6(a)).

In the specific example, the node 3, the node 6, and the node 7 are primary nodes. Therefore, as illustrated in FIG. 6(b), the NW configuration display unit 17 may emphatically display these nodes as primary nodes to make it easy for the user to visually recognize the primary nodes. Further, the NW configuration display unit 17 may emphatically display not only the primary nodes but also the links connected to the primary nodes. For instance, when the node 3, the node 5, and the node 7 are primary nodes, the NW configuration display unit 17 may emphatically display each of the nodes and may also emphatically display the links connecting the nodes, as illustrated in FIG. 6(c).

As described above, according to the exemplary embodiment, the primary node calculation unit 14 calculates an index (Capacity amount) for each node by using NW-configuration-information, and the primary node coefficient setting unit 15 sets higher primary node coefficient for the node as the index increases. Here, the primary node coefficient indicates a degree of not changing the rendering position of a network diagram associated with a change in the network configuration. The aforementioned configuration makes it possible to render a network diagram with which the user can continuously and easily find a target node, even when nodes or links composing a network dynamically change.

Thus, even in a condition in which the network configuration dynamically changes, in other words, a node or a link is added or updated, the user can visually recognize a network diagram without losing track of a node to be monitored, while continuing to memorize the overall positional relationship.

In other words, with use of the network-diagram rendering system in the exemplary embodiment, it is possible to prevent a drastic change in the coordinates of a part of nodes composing a network, even when nodes or links composing the network dynamically change. Thus, it is possible to retain a network diagram (mental map) memorized by the user. More specifically, even when nodes or links composing a network dynamically change, the user can find a node to be monitored, and can continue to monitor the network, while retaining a network diagram that is roughly memorized.

Second Embodiment

Figure 7:
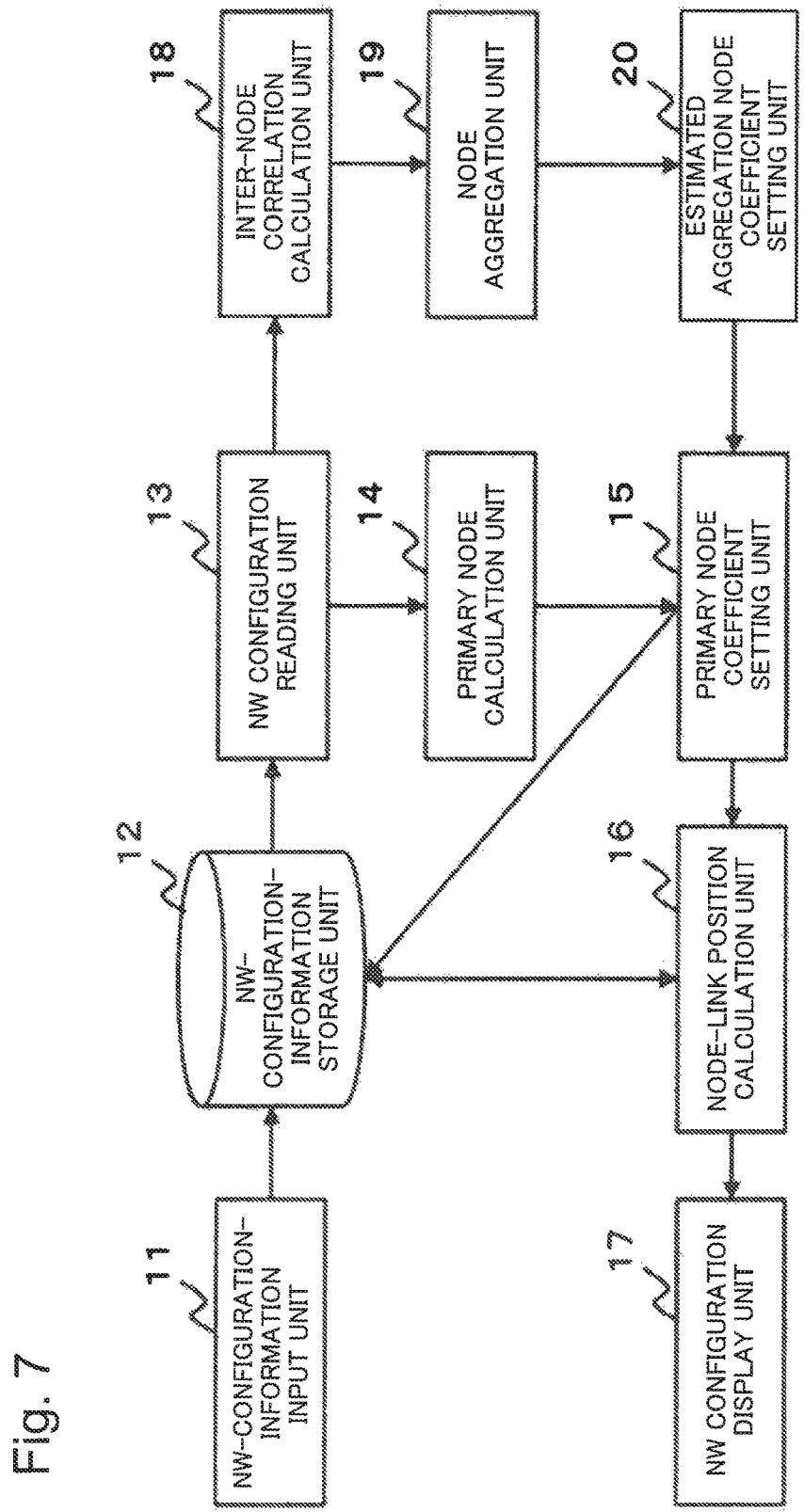
FIG. 7 is a block diagram illustrating a configuration example of a second exemplary embodiment of the network-diagram rendering system according to the present invention.

FIG. 7 is a block diagram illustrating a configuration example of the second exemplary embodiment of the network-diagram rendering system according to the present invention. The same constituent elements in the second exemplary embodiment as those in the first exemplary embodiment are indicated by the same reference signs as in FIG. 1, and description thereof is omitted.

The network-diagram rendering system in the exemplary embodiment is provided with an NW-configuration-information input unit 11, an NW-configuration-information storage unit 12, an NW configuration reading unit 13, a primary node calculation unit 14, a primary node coefficient setting unit 15, a node-link position calculation unit 16, an NW configuration display unit 17, an inter-node correlation calculation unit 18, a node aggregation unit 19, and an estimated aggregation node coefficient setting unit 20.

More specifically, the network-diagram rendering system in the exemplary embodiment is different from the network-diagram rendering system in the first exemplary embodiment in a point that the network-diagram rendering system in the exemplary embodiment is further provided with the inter-node correlation calculation unit 18, the node aggregation unit 19, and the estimated aggregation node coefficient setting unit 20. In the following, the network-diagram rendering system in the second exemplary embodiment is described mainly on the points different from the first exemplary embodiment. In the following description, the same content as in the first exemplary embodiment is omitted as necessary.

The inter-node correlation calculation unit 18 obtains NW-configuration-information from the NW configuration reading unit 13, and calculates a correlation between nodes. The correlation between nodes is a value which is calculated to be higher, as a plurality of locally existing nodes are more densely connected by links. The inter-node correlation calculation unit 18 may calculate an inter-node correlation based on NW-configuration-information by using a well-known method.

Figures 8, 9:
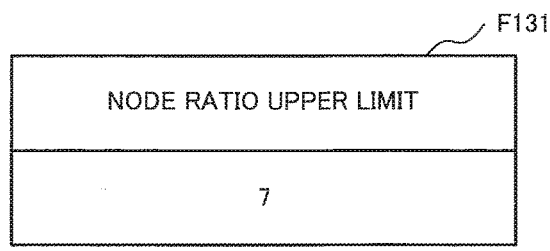
FIG. 8 is an explanatory diagram illustrating an example of inter-node correlations.
FIG. 9 is an explanatory diagram illustrating an example of a node ratio upper limit.

FIG. 8 is an explanatory diagram illustrating an example of the inter-node correlation. As illustrated in FIG. 8, the inter-node correlation is calculated between respective nodes. The inter-node correlation calculation unit 18 sends NW-configuration-information including the calculated inter-node correlations to the node aggregation unit 19.

The node aggregation unit 19 receives NW-configuration-information from the inter-node correlation calculation unit 18 and generates a node obtained by aggregating a plurality of nodes (hereinafter, also referred to as an aggregated node), based on the received NW-configuration-information. Specifically, the node aggregation unit 19 aggregates nodes in such a manner that the number of nodes does not exceed a node ratio upper limit which defines the upper limit of the number of nodes.

FIG. 9 is an explanatory diagram illustrating an example of the node ratio upper limit. In the example illustrated in FIG. 9, it is indicated that a node ratio upper limit F131 is set to "7". The node ratio upper limit may be a specific number of nodes, or may be a value indicating a ratio of nodes with respect to the total number of nodes.

Figure 10:
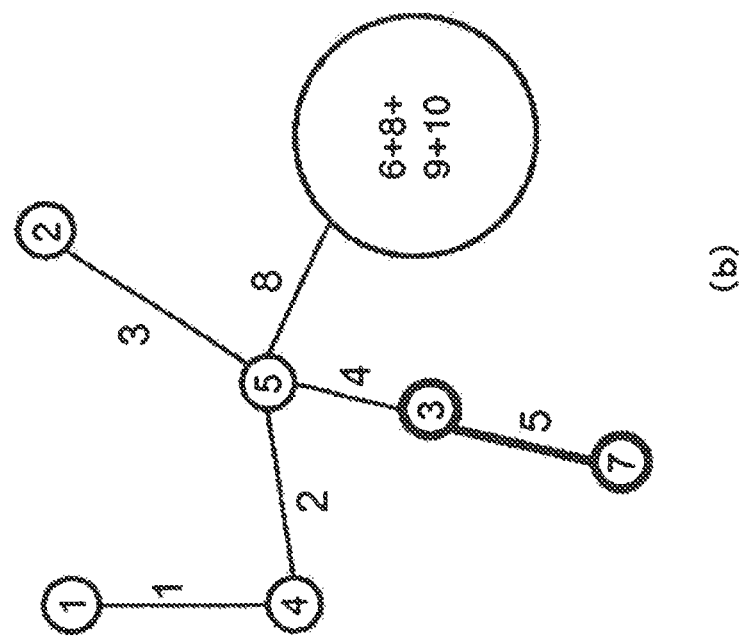
FIG. 10 is an explanatory diagram illustrating an example of a result obtained by aggregating the nodes illustrated in FIG. 6.
Figure 10:
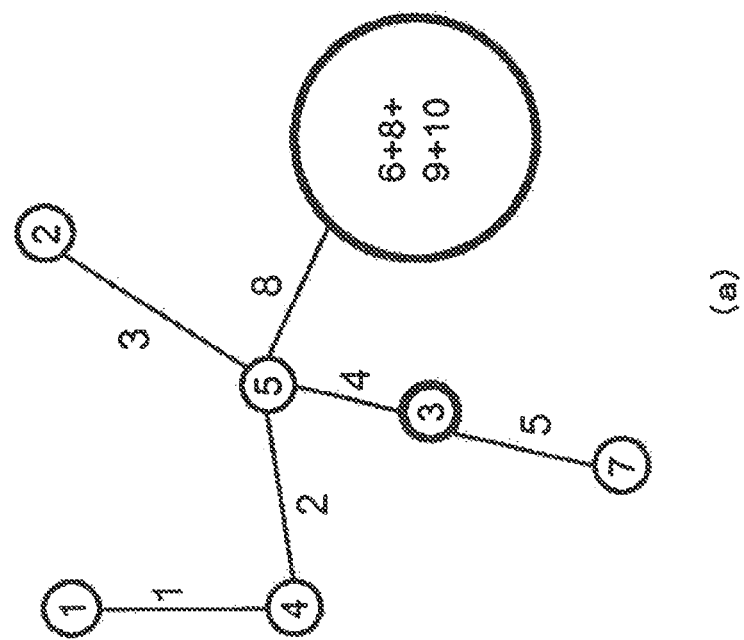

FIG. 10 is an explanatory diagram illustrating an example of a result obtained by aggregating the nodes illustrated in FIG. 6. In the examples illustrated in FIG. 6, the node 6, the node 8, the node 9, and the node 10 are a plurality of nodes which exist locally and are densely connected by links. Aggregating nodes refers to setting a node group in a state that each of nodes which exists locally are connected to each other by a common node, as exemplified by the node 6, the node 8, the node 9, and the node 10 illustrated in FIG. 6 to be one node again, so as to substitute for the four nodes. The aggregated node in this case is denoted as the node (6+8+9+10).

In the exemplary embodiment, the node aggregation unit 19 sets the Capacity amount of the node (6+8+9+10), as the total of the Capacity amount of the node 6, the node 8, the node 9, and the node 10. However, the method for calculating the Capacity amount of an aggregated node is not limited to the method for adding the Capacity amounts of the nodes. The node aggregation unit 19 may calculate a Capacity amount based on the communication ability of a newly created aggregated node.

The node aggregation unit 19 repeats the operation of extracting nodes whose inter-node correlations are high, and aggregating the nodes based on the aforementioned steps until the number of nodes becomes equal to or less than the number of nodes defined by the node ratio upper limit. In this way, the node aggregation unit 19 aggregates the nodes whose inter-node correlations are high so that the number of nodes becomes equal to or less than the reference number. Then, the node aggregation unit 19 sends NW-configuration-information including the aggregation result to the estimated aggregation node coefficient setting unit 20.

The estimated aggregation node coefficient setting unit 20 calculates a primary node coefficient based on NW-configuration-information after aggregating nodes. In the exemplary embodiment, the primary node coefficient is calculated by a calculation method different from the determination method described in the first exemplary embodiment. For instance, the estimated aggregation node coefficient setting unit 20 calculates a primary node coefficient by using Eq. (1) indicated below. Note that Eq. (1) to be indicated below is an example of a method for calculating a primary node coefficient.

$$\text{Primary node coefficient} = \text{primary node coefficient set for the primary node in the first exemplary embodiment} \times \text{number of nodes that can be reached from a target node by 2 hops} \quad \text{Eq. (1)}$$

The estimated aggregation node coefficient setting unit 20 calculates a primary node coefficient for an aggregated node to be higher, even when the node is not determined to be a primary node by the method in the first exemplary embodiment (i.e., the node which has a large number of links in common between a plurality of locally existing nodes, and estimated to be aggregated as one node, as a measure for suppressing upper limit of the number of nodes).

More specifically, the estimated aggregation node coefficient setting unit 20 may set a primary node coefficient to be higher, as more number of nodes can be reached from each node by a predetermined hop number. The estimated aggregation node coefficient setting unit 20 retains the calculation result as the primary node coefficient for each node, and sends NW-configuration-information including the calculated primary node coefficients to the primary node coefficient setting unit 15.

Figure 11:
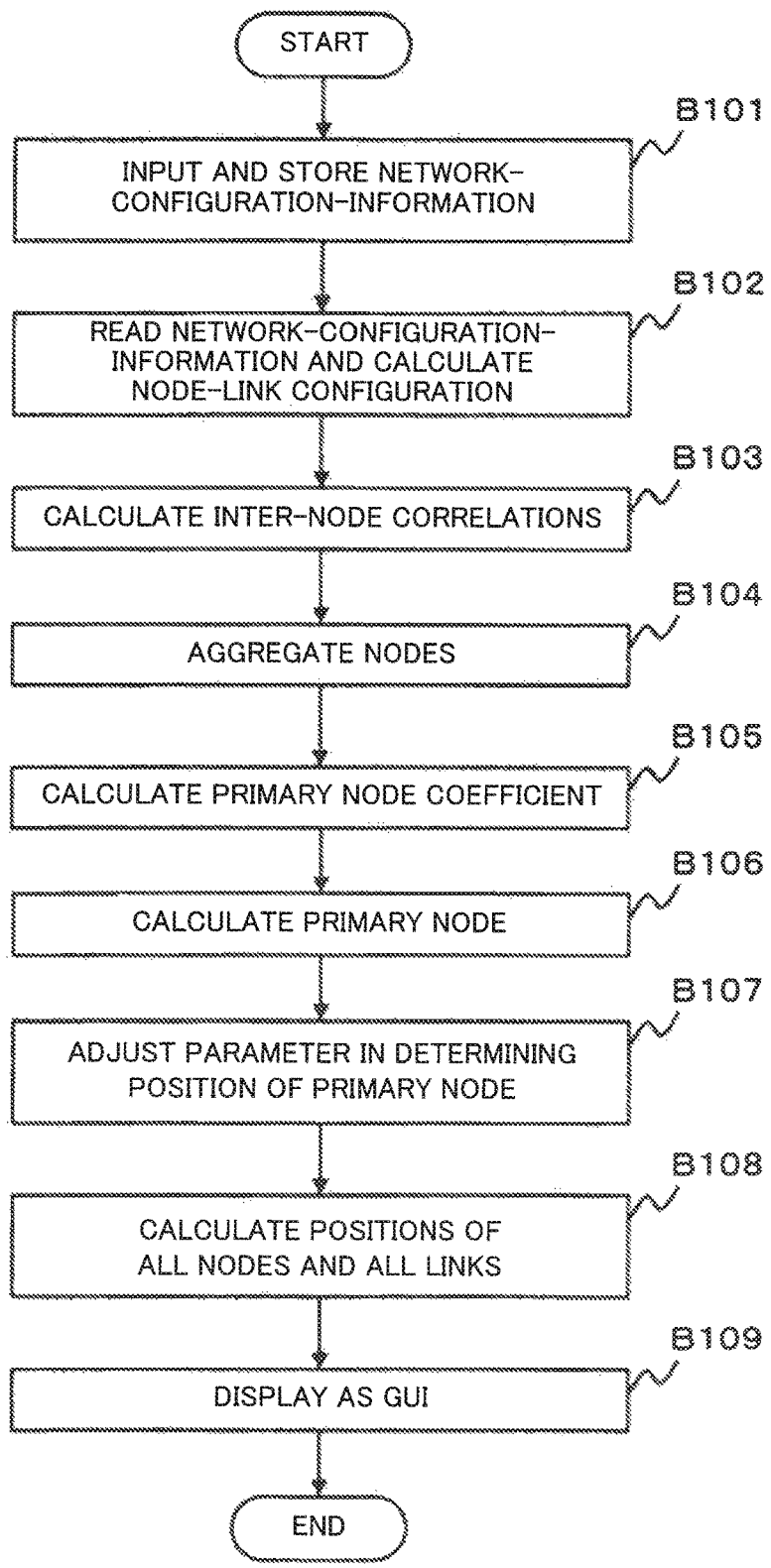
FIG. 11 is a flowchart illustrating an operation example of the network-diagram rendering system in the second exemplary embodiment.

Next, an operation of the network-diagram rendering system in the exemplary embodiment is described. FIG. 11 is a flowchart illustrating an operation example of the network-diagram rendering system in the exemplary embodiment.

The processing from Step B101 to Step B102 in which the NW-configuration-information input unit 11 inputs NW-configuration-information, the NW-configuration-information storage unit 12 stores the NW-configuration-information, and the NW configuration reading unit 13 calculates a node-link configuration is the same as the processing from Step A101 to Step A102 illustrated in FIG. 2.

Subsequently, the inter-node correlation calculation unit 18 obtains NW-configuration-information from the NW configuration reading unit 13, and calculates inter-node correlations illustrated, for instance, in FIG. 8 (Step B103). The inter-node correlation calculation unit 18 may calculate inter-node correlations by using a well-known method based on NW configuration information. The inter-node correlation calculation unit 18 sends NW-configuration-information including the calculated inter-node correlations to the node aggregation unit 19.

The node aggregation unit 19 receives the inter-node correlations illustrated in FIG. 8 from the inter-node correlation calculation unit 18, and ranks the inter-node correlations. Subsequently, the node aggregation unit 19 aggregates the nodes in the descending order of the inter-node correlations, which is obtained as a result of ranking (Step B104). The aggregated node is expressed as one node. The node aggregation unit 19 generates, as an aggregation result, a node after the aggregation and a flag indicative of the aggregation, and sends NW-configuration-information including the aggregation result to the estimated aggregation node coefficient setting unit 20.

For instance, in the example illustrated in FIG. 10, the node aggregation unit 19 may generate an aggregation result including an aggregated node, i.e., "node (6+8+9+10)" and a flag indicating that the node 6, the node 8, the node 9, and the node 10 are aggregated.

The estimated aggregation node coefficient setting unit 20 receives NW-configuration-information from the node aggregation unit 19, and starts an operation. The estimated aggregation node coefficient setting unit 20 calculates a primary node coefficient (Step B105). For instance, the estimated aggregation node coefficient setting unit 20 may calculate a primary node coefficient by using Eq. (1) indicated above. Alternatively, the estimated aggregation node coefficient setting unit 20 may employ another calculation equation, as far as the equation is capable of calculating a primary node coefficient in such a manner as to suppress a change in the primary node. The estimated aggregation node coefficient setting unit 20 sends the calculated primary node coefficient to the primary node coefficient setting unit 15.

On the other hand, as well as Step A103 in FIG. 2, the primary node calculation unit 14 calculates an index for specifying a primary node, and inputs the index to the primary node coefficient setting unit 15 (Step B106).

The primary node coefficient setting unit 15 sets a primary node coefficient for each node. In the exemplary embodiment, the primary node coefficient setting unit 15 determines a primary node based on a primary node coefficient calculated by the estimated aggregation node coefficient setting unit 20 (Step B107).

The processing thereafter, i.e., the processing from Step B108 to Step B109 for determining the positions of nodes and the positions of links, and rendering a network diagram is the same as the processing from Step A105 to Step A106 in FIG. 2.

Next, an operation of the network-diagram rendering system in the exemplary embodiment is described by using the flowchart illustrated in FIG. 11, and the specific examples illustrated in FIG. 3 to FIG. 6. The processing from Step B101 to Step B102 illustrated in FIG. 11 is the same as the processing from Step A101 to Step A102 illustrated in FIG. 2, and therefore, description thereof is omitted.

The inter-node correlation calculation unit 18 obtains NW-configuration-information from the NW configuration reading unit 13, and calculates inter-node correlations (Step B103). The node aggregation unit 19 aggregates the nodes (Step B104). For instance, in the example illustrated in FIG. 6, the node 6, the node 8, the node 9, and the node 10 can be regarded as a plurality of locally existing nodes that are densely connected by links. Therefore, the node aggregation unit 19 aggregates the node 6, the node 8, the node 9, and the node 10.

FIG. 10(a) illustrates an example in which the nodes whose Capacity meters are ranked top 30% are represented as primary nodes. More specifically, in the exemplary embodiment, the Capacity meter of the node (6+8+9+10) is calculated to be 89, and therefore, the nodes that are ranked top 30% are the node (6+8+9+10) and the node 3. Therefore, the node (6+8+9+10) and the node 3 are emphatically displayed.

The estimated aggregation node coefficient setting unit 20 calculates a primary node coefficient (Step B105). In the specific example, a primary node coefficient is calculated by using Eq. (1) indicated above. Therefore, the estimated aggregation node coefficient setting unit 20 calculates "the number of nodes that can be reached from a target node by 2 hops" with respect to the terms included in Eq. (1) indicated above, and inputs NW-configuration-information including the calculation result to the primary node coefficient setting unit 15. In the specific example, the estimated aggregation node coefficient setting unit 20 calculates a primary node coefficient assuming that all the nodes within an aggregated node are included in the number of nodes that can be reached from a target node.

On the other hand, as well as the first exemplary embodiment, the primary node calculation unit 14 calculates an index for specifying a primary node, and sets the calculated index in a Capacity amount of NW-configuration-information (Step B106).

The primary node coefficient setting unit 15 ranks the nodes based on the calculated Capacity amounts. Subsequently, the primary node coefficient setting unit 15 sets the primary node coefficient for the highly-ranked nodes of the ratio, illustrated in FIG. 5, to 1, and sets the primary node coefficient for the rest of the nodes to 0.

Further, the primary node coefficient setting unit 15 determines a primary node based on the primary node coefficient calculated by the estimated aggregation node coefficient setting unit 20 (Step B107). In the specific example, the primary node coefficients of the node 3, the node 6, and the node 7 are firstly set to 1, and the primary node coefficients of the rest of the nodes are then set to 0.

The number of nodes that can be reached from the node 3 by 2 hops is 9, which includes the number of nodes, 4, of the aggregated node. Likewise, the number of nodes that can be reached from the node 7 by 2 hops is 8, including the number of nodes of the aggregated node. On the other hand, the number of nodes that can be reached from the node 6 is 6. Therefore, the nodes (two nodes) whose primary node coefficients are ranked top 30% are the node 3 and the node 7. Accordingly, as a result of the processing, the primary node coefficient setting unit 15 determines the node 3 and the node 7 to be the primary nodes, as substitutes for the node 3 and the node (6+8+9+10).

The node-link position calculation unit 16 calculates the positions of the nodes and the positions of the links in such a manner as to retain the position of the primary node unchanged (Step B108). Subsequently, the NW configuration display unit 17 renders a network diagram based on the NW configuration information calculated up to Step B108 (Step B109). In the case of the specific example, as illustrated in FIG. 10B, the NW configuration display unit 17 emphatically displays the primary nodes.

As described above, according to the exemplary embodiment, the inter-node correlation calculation unit 18 calculates an inter-node correlation based on an NW configuration, the node aggregation unit 19 aggregates the nodes whose inter-node correlations are high so that the number of nodes becomes equal to or less than the reference number, the estimated aggregation node coefficient setting unit 20 calculates the primary node coefficient based on network configuration information with the nodes aggregated.

Thereafter, the primary node coefficient setting unit 15 determines the node whose primary node coefficient is high to be a primary node. The node-link position calculation unit 16 calculates the positions of the nodes and the positions of the links in such a manner as to retain the position of the primary node unchanged. Thus, the NW configuration display unit 17 can render a network diagram with which the user can easily continue to find a target node, even when nodes or links composing a network dynamically change.

More specifically, according to the exemplary embodiment, in addition to the advantageous effects of the first exemplary embodiment, the user can continue to find a node to be monitored, as a part of the primary node or in a certain direction starting from the primary node, even when the network becomes large-scaled, and a huge number of nodes or links are generated. This is advantageous in reducing a load for grasping a node.

Figure 12:
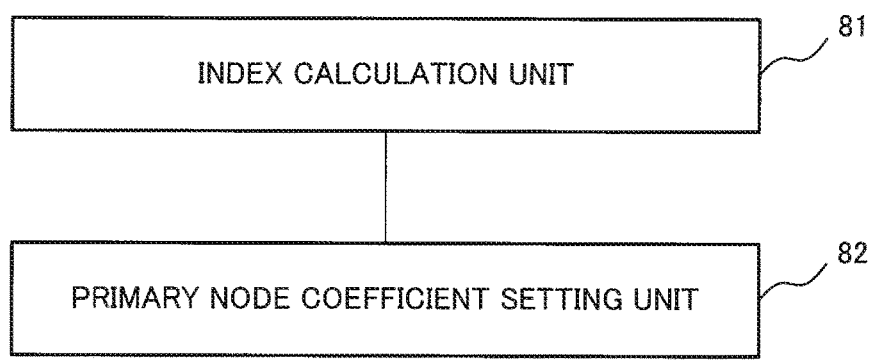
FIG. 12 is a block diagram illustrating an outline of a network-diagram rendering system according to the present invention.

Next, a summary of the present invention is described. FIG. 12 is a block diagram illustrating an outline of the network-diagram rendering system according to the present invention. The network-diagram rendering system according to the present invention is a network-diagram rendering system for rendering a network diagram including nodes and links as elements of a network configuration. The network-diagram rendering system is provided with: an index calculation unit 81 (e.g., the primary node calculation unit 14) which calculates, for each node, an index (e.g., the Capacity amount) indicating a degree that the node is a primary node in the network configuration, using network configuration information (e.g., the NW-configuration-information) as information to be obtained from the network configuration; and a primary node coefficient setting unit 82 (e.g., the primary node coefficient setting unit 15) which sets a primary node coefficient for the node to be higher as the index increases, the primary node coefficient being a value indicating a degree of not changing a rendering position of a network diagram associated with a change in the network configuration.

According to the aforementioned configuration, it is possible to render a network diagram with which the user can easily and continuously find a target node, even when nodes or links composing a network dynamically changes.

Specifically, the network-diagram rendering system may be provided with a node position calculation unit (e.g., the node-link position calculation unit 16) which calculates positions of the nodes. In this configuration, the primary node coefficient setting unit 82 may specify the node whose calculated index is highly ranked as the primary node, and the node position calculation unit may calculate the position of the primary node in such a manner as to suppress a change in the position of the node specified as the primary node (e.g., skip calculation of the coordinates of the primary node).

According to the aforementioned configuration, it is possible to suppress a change in the coordinates of the primary node. Therefore, the user can identify the primary node at approximately the same position even after the network diagram is rendered again.

Further, the network diagram-rendering system may be provided with: an inter-node correlation calculation unit (e.g., the inter-node correlation calculation unit 18) which calculates an inter-node correlation based on the network configuration information, the inter-node correlation being calculated to be higher, as the locally existing nodes are more densely connected by links; a node aggregation unit (e.g., the node aggregation unit 19) which aggregates the nodes whose inter-node correlations are high to make the number of nodes equal to or smaller than a reference number; and a primary node coefficient calculation unit (e.g., the estimated aggregation node coefficient setting unit 20) which calculates the primary node coefficient based on network configuration information with the nodes aggregated.

According to the aforementioned configuration, the user can continue to find a node to be monitored, as a part of the primary node or in a certain direction starting from the primary node, even when the network becomes large-scaled, and a huge number of nodes or links are generated. This is advantageous in reducing a load for grasping a node.

Further, the primary node coefficient setting unit 82 may set the primary node coefficient for the node to be higher, as more number of nodes can be reached from a target node by a predetermined hop number (e.g., 2 hops), among the nodes whose calculated indexes are highly ranked (e.g., see Eq. (1)). In this configuration, the primary node coefficient setting unit 82 may set the number of nodes that can be reached from the target node (e.g., the node 7) for all the nodes (e.g., the node 6, the node 8, the node 9, and the node 10) within the aggregated node (e.g., the node (6+8+9+10) in FIG. 10).

Further, a value (e.g., the Capacity in FIG. 4) representing a degree of importance in the network configuration may be set for each link. The index calculation unit 81 may also calculate the index for each node based on the value of the link connected to each node (e.g., by totalizing the Capacities of the links connected to each node).

The invention of the present application has been described as above referring to the exemplary embodiments and the examples. The invention of the present application, however, is not limited to the exemplary embodiments and the examples described above. The configuration and the details of the invention of the present application may be modified in various ways comprehensible to a person skilled in the art within the scope of the invention of the present application.

This application claims the priority based on Japanese Patent Application No. 2013-234564 filed on Nov. 13, 2013, the disclosure of which is incorporated herein in its entirety.

REFERENCE SIGNS LIST

11 NW-configuration-information input unit
12 NW-configuration-information storage unit
13 NW configuration reading unit
14 Primary node calculation unit
15 Primary node coefficient setting unit
16 Node-link position calculation unit
17 NW configuration display unit
18 Inter-node correlation calculation unit
19 Node aggregation unit
20 Estimated aggregation node coefficient setting unit

What is claimed is:

1. A network-diagram rendering system for rendering a network diagram including nodes and links as elements of a network configuration, the network-diagram rendering system comprising:
a processor; and
a non-transitory computer-readable data storage medium storing instructions executable by a processor to:
calculate, for each node, an index indicating a degree that the node is a primary node in the network configuration, using network configuration information as information to be obtained from the network configuration;
set a primary node coefficient for the node to be higher as the index increases, the primary node coefficient being a value indicating a degree of not changing a rendering position of a network diagram associated with a change in the network configuration, including specifying, as a primary node, a node whose calculated index is highly ranked;
calculate a position of a node; and
render and display the network diagram, continuously as the network configuration dynamically changes, permitting continuous visual monitoring of the network configuration without requiring manual repositioning of the nodes,
wherein the position of the primary node is calculated in such a manner as to suppress a change in a position of the node specified as the primary node.

2. The network-diagram rendering system according to claim 1, wherein the processor executes the instructions to further calculate an inter-node correlation based on network configuration information, the inter-node correlation being calculated to be higher, as a plurality of locally existing nodes are more densely connected by links;
aggregate the nodes whose inter-node correlations are high to make a number of nodes smaller than or equal to a reference number; and
calculate a primary node coefficient based on network configuration information with nodes aggregated.

3. The network-diagram rendering system according to claim 2, wherein
the a primary node coefficient is set to be higher, as more number of nodes can be reached within a predetermined hops from each node among nodes whose calculated indexes are highly ranked.

4. The network-diagram rendering system according to claim 3, wherein
all nodes within an aggregated node are set to be a number of nodes that can be reached from a target node.

5. The network-diagram rendering system according to claim 1, wherein
a value representing a degree of importance in a network configuration is set for each link, and
an index is calculated for each node based on the value of the link connected to the node.

6. A network-diagram rendering method for rendering a network diagram including nodes and links as elements of a network configuration, the network-diagram rendering method comprising:
calculating, for each node, an index indicating a degree that the node is a primary node in the network configuration, using network configuration information as information to be obtained from the network configuration;

setting a primary node coefficient for the node to be higher as the index increases, the primary node coefficient being a value indicating a degree of not changing a rendering position of a network diagram associated with a change in the network configuration;

specifying a node whose calculated index is highly ranked as a primary node;

calculating a position of the primary node in such a manner as to suppress a change in a position of the node specified as the primary node; and rendering and displaying the network diagram, continuously as the network configuration dynamically changes, permitting continuous visual monitoring of the network configuration without requiring manual repositioning of the nodes.

7. A non-transitory computer readable medium that stores a program and used in a computer configured to render a network diagram including nodes and links as elements of a network configuration, the program causing the computer to execute:

calculating, for each node, an index indicating a degree that the node is a primary node in the network configuration, using network configuration information as information to be obtained from the network configuration;

setting a primary node coefficient for the node to be higher as the index increases, the primary node coefficient being a value indicating a degree of not changing a rendering position of a network diagram associated with a change in the network configuration;

calculating a position of a node;

rendering and displaying the network diagram, continuously as the network configuration dynamically changes, permitting continuous visual monitoring of the network configuration without requiring manual repositioning of the nodes, wherein in setting the primary node coefficient, a node whose calculated index is highly ranked is specified as the primary node, and in calculating the node position, a position of the primary node is calculated in such a manner as to suppress a change in a position of the node specified as the primary node.

* * * * *